Aug. 16, 1932.                O. E. HUNT                1,872,144
                                BRAKE
                          Filed Jan. 6, 1928
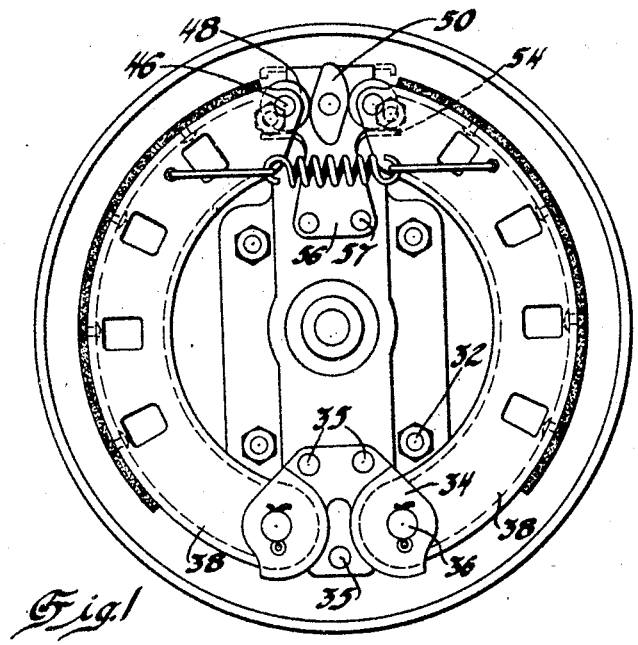
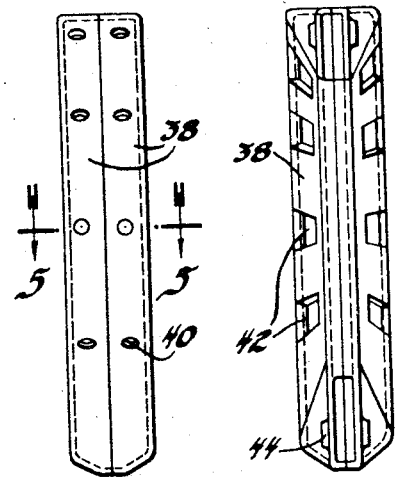
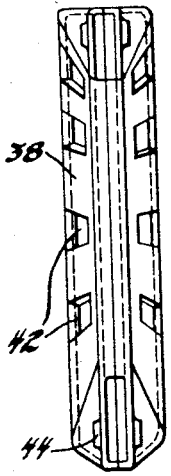
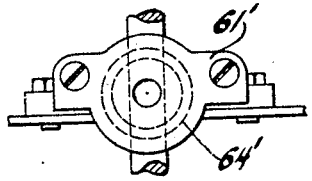
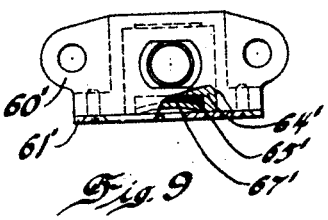
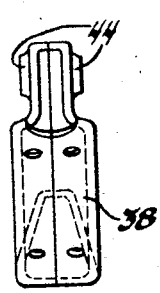
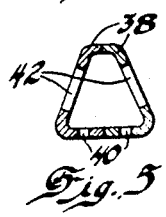
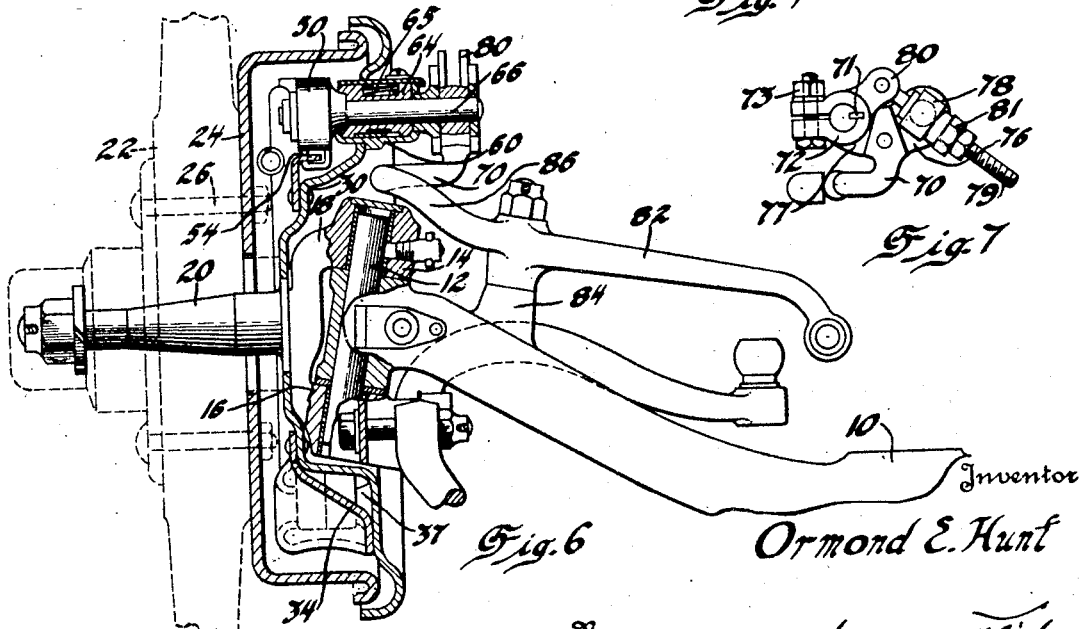
Inventor
Ormond E. Hunt Patented Aug. 16, 1932

1,872,144

UNITED STATES PATENT OFFICE

ORMOND E. HUNT, OF DETROIT, MICHIGAN, ASSIGNOR TO GENERAL MOTORS CORPORATION, OF DETROIT, MICHIGAN, A CORPORATION OF DELAWARE

BRAKE

Application filed January 6, 1928. Serial No. 244,919.

This invention relates to brakes and particularly to an internal brake for use on vehicles. The novel structure may be used on both front and rear vehicle wheels but it is intended more particularly for use on front steering wheels.

It is well-known that in the case of internal brakes provision should be made to "float" the actuating cam located between the adjacent ends of the two shoes or between the adjacent ends of the band. Numerous expedients have been employed to accomplish that purpose. It is with such an expedient that this invention is concerned.

It is an object of the invention to provide a floating cam carried by a shaft and to so arrange an actuating cam shaft arm that the floating of the cam shall not interfere with the relation between the actuating arm and the operating means therefor.

As another object the invention aims to provide a resilient restraining means to prevent undesirable movements of the cam and shaft and to maintain the same in positions of adjustment automatically attained in the action of brake application. Other objects and advantages will be understood from the following specification.

The invention has been illustrated in connection with a front wheel brake having novel details in other respects which are included in the description to clearly show the relation of the floating cam structure to the brake as a whole.

Referring to the drawing:

Fig. 1 is a side elevation of front wheel brake mechanism, with the wheel removed.

Fig. 2 is a view of the brake shoe in elevation facing the lining carrying portion.

Fig. 3 is an elevation of the shoe facing its inner side.

Fig. 4 is a view of the shoe in end elevation.

Fig. 5 is a cross section on line 5—5 of Fig. 2.

Fig. 6 is a view of the front axle and wheel carrying spindle in elevation, parts being broken away and in section.

Fig. 7 illustrates a detail, the adjustment for the cam shaft.

Fig. 8 is an inverted plan view of a modified form of centralizing device.

Fig. 9 is a view in elevation of the same.

Referring by reference characters to the drawing, the front axle is designated by 10. Steering knuckle 18 is swivelled to axle 10 by means of a king pin 12 passing through alined openings in the end of the axle 10 and in knuckle arms 14 and 16. The steering knuckle is formed with the usual stub axle 20 for the front wheel 22. On the inner side of wheel 22 is secured as by bolts 26, a brake drum 24. Surrounding the knuckle and piloted on a shoulder 28 is a backing plate 30. Bolts 32 securely fix the backing plate in position on the knuckle so that it turns with the wheel in steering.

It will be understood that this backing plate carries the anchors for the brake shoes and also the actuating means for the shoes. Referring now to the anchoring means, an auxiliary plate 34 is secured to the backing plate by suitable fastening means 35. The shape of the auxiliary plate is such that when attached to the backing plate two recesses or pockets are formed, defined by the backing plate 30 and auxiliary plate 34 registering apertures in which carry pivot bolts 36 for the two shoes. For the purpose of forming suitable bearings the metal of the plates 30 and 34 at the apertures may be drifted out as shown at 37 in Fig. 6. Pivoted on pivot bolts 36 are shoes 38 which are to engage the rotating drum 24 carried by the wheel to stop or check its rotation.

The brake shoes shown in Figs. 2–5 inclusive are each made in the form of a closed box from sheet metal. Each shoe is made up of two channel shaped stampings having a web of arc shape and side flanges. For the greater part of the length of the shoe the dimensions of the two flanges are unequal. Two such halves are placed together to make a closed shoe, the flanges of greater dimensions along the outer face. The halves are welded together along the median lines. The cleavage line 38 (Fig. 5) illustrates the shape of each half shoe. Rivet holes 40 are made in the outer wall for securing the usual lining. Openings 42 are formed at suitable intervals on each half to provide access to the interior for attaching the lining by rivets. At the ends of the shoes its trapezoidal shape (shown best in sectional view, Fig. 5) is flattened as shown in Fig. 3 and Fig. 4. At these points the walls are apertured and the metal drifted out to form bearing portions 44. At the anchor end the bearing portions 44 are associated with bearing portions 37 of the plates 30 and 34 in providng the pivoted connection for the shoes. At the other end, pins 46 are carried by the shoes and upon the pins 46 are rollers 48. It it the function of these rollers to be engaged by the actuating cam 50 in the movement of the shoes into contact with the drum. Adjacent the ends of the shoes engaged by the cam the backing plate is provided with a plate 56 secured by fastening means 57. This plate 56 is formed with wings 54 entering openings of like axial extent in the shoes. This provision prevents any transverse movement of the shoes, while freely permitting the movement of the shoes to and from brake applying position.

The backing plate 30 at a point above the king pin carries a housing 60 suitably secured thereto. Within the housing 60 is a centralizing fulcrum member 64 having a bearing opening in which is journalled a cam shaft 66, carrying the cam 50. The shapes of the housing 60 and fulcrum member 64 are such that the latter may rotate within the former on a substantially vertical axis. In such movement it will be seen that the cam may move substantially circumferentially to accommodate itself to unequal wear of the linings of the two shoes. For the purpose of restraining too free movements of the fulcrum member 64 in the housing and of retaining the cam shaft in new positions of adjustment, a coil spring 65 is located in a recess of the fulcrum member which spring engages an overlying part of the housing 60 as shown in Fig. 6. It will be understood that this use of a coil spring is intended as illustrative and that any known kind of resilient means, as rubber, may be used, if preferred.

In the modified form shown in Fig. 8 and Fig. 9 the housing is designated as 60'. To it is secured a cover 61'. Within the housing rotates a centralizing fulcrum member 64' carrying the cam shaft as before. The fulcrum member is recessed beneath the cam shaft and a rubber block 65' held by bent plate 67' positioned under pressure serves the purpose of spring 65 of the first form.

For rotating the cam and cam shaft about the longitudinal axis of the latter in the act of brake application, the shaft is provided with an arm 70. It is desirable to provide for positions of adjustment of the cam shaft relative to its arm 70. Adjustment at this point may be made to correct for wear of the brake shoes without changing the position of the arm 70 or any of the operating means for this arm.

As a convenient means of making this adjustment the cam shaft has keyed and clamped thereto as shown at 71, 73 respectively, an arm 72. The cam shaft arm 70 has an intermediate head portion from which extends end furcations 76 and 77, one only of each of these furcations 76 and 77 appearing in Fig. 7. The furcations 77 freely surround the cam shaft and straddle arm 72. Between the furcations 76 is trunnioned a sleeve 78, through which passes the threaded shank of an adjusting bolt 79, the head of which is rotatably carried by the furcations 80 of fixed arm 72. Suitable adjusting and lock nuts 81 on shank 79 provide for varying the position of fixed arm 72 and cam shaft 66 relative to the operating arm 70. Arm 70 is as shown outwardly bent and is extended to a point where its end to be operatively engaged in the act of brake application lies in the extension of the axis of swinging of fulcrum member 64. By this means the cam shaft may move so that its cam accommodates itself to varying conditions of self-actuation and lining wear without in the least interfering with the relation between the actuating mechanism and the operating mechanism.

For the purpose of applying the brake a lever 82 may be pivoted at 84 on the axle. The operating end 86 of the lever is intended to effect the rotation of the cam shaft through the swinging of its arm 70 as will be obvious. The adjustment may be so made that the end 86 of lever 82 may lie adjacent the extension of the axis of king pin 12 when the brake is applied. Preferably when in brake applying position the center of the rounded end of the lever arm 70 will lie in the axis of pivot 12. When the axle is steered this rounded end merely turns upon the flat surface of the end 86 of lever 82 as best shown in Fig. 7. If so arranged, it is obvious that the swivelling of the wheels in steering will not effect the intensity of brake application. It may be observed that it is not at all necessary that the king pin axis and the axis of rotation of fulcrum 64 coincide. As a matter of fact, they are not so shown. The fulcrum 64 for the cam shaft is capable of other locations than that shown, it being only necessary that its arm 70 be so positioned that its point of engagement with operating mechanism, whatever that be, shall lie in the axis of rotation of the fulcrum member. With this arrangement the cam is free to move to automatically compensate with no interference with the actuating mechanism.

For operating a brake, suitable operating connections will be associated with lever 82 and with the rear wheel brakes, if such brakes are used for simultaneous actuation with the front wheel brakes and by the same operating means. These connections are not a part of the invention and are not shown.

In accordance with this invention the cam, with which the inventive idea is primarily concerned, is mounted to float so that it may accommodate itself to the shoes. Such accommodation is made without affecting the brake operating mechanism in its relation to the actuating parts.

I claim:

1. In a brake, a supporting plate, an actuating shaft carried thereby, means to mount said actuating shaft on said plate for rocking relative to said plate about an axis at right angles to its longitudinal axis of rotation said actuating shaft having an arm terminating in a point in the extension of said rocking axis.

2. In a brake, a supporting plate, an actuating shaft carried thereby, means to mount said actuating shaft on said plate for rocking relative to said plate about an axis at right angles to its longitudinal axis of rotation together with an arm loosely mounted on said actuating shaft and means to secure said actuating shaft and arm in desired position of adjustment.

3. In a brake, a wheel, a brake drum, a concentric fixed plate, a housing rigidly secured thereto, a centralizing member therein rotating upon an axis substantially radial to the plate, a cam shaft journalled in said centralizing member, a cam on said cam shaft within the drum.

4. The invention defined by claim 3, together with an arm on said cam shaft, said arm extended to a point for engagement with brake operating means, said point lying in the axis of rotation of said centralizing member.

5. The invention set forth in claim 3, said centralizing member formed with a recess, and cushioning means in said recess to restrain the movements of said member about its axis.

6. In combination, an axle, a stub axle pivotally connected thereto, a wheel on said stub axle, a brake part on said wheel, brake elements adapted to engage said part, means to force said elements into engagement with said part with a substantially uniform relative pressure regardless of wear on the brake elements, said means including two parts which when the brake is applied engage one another approximately on the axis about which the stub axle turns, one of said parts being adapted to swing about an axis extending radially of the wheel and which axis substantially intersects the axis about which the stub axle turns.

7. In combination, an axle, a stub axle pivoted thereon, a wheel on the stub axle, a brake drum on said wheel, brake elements adapted to engage said drum, a cam for spreading said element against said drum, said cam mounted to rock about an axis at right angles to its longitudinal axis of rotation and means for actuating said cam shaft, comprising two parts engaging one another approximate the axis about which the stub axle turns when the brake is applied.

8. In combination, an axle, a stub axle pivotally connected thereto, a wheel on said stub axle, a brake drum on said wheel, brake elements adapted to be spread into engagement with the inner surface of said drum, means to spread said elements with a substantially uniform relative pressure regardless of wear of the braking elements, said means including a shaft, an arm thereon, and operating means engaging said arm approximate the axis about which the stub axle turns, said shaft and arm being mounted to swing bodily about an axis substantially radial and which axis substantially intersects the axis about which the stub axle turns.

9. In combination, an axle, a stub axle pivotally connected thereto, a wheel on the stub axle, a brake drum on said wheel, means within said drum adapted to engage therewith, a shaft for actuating said means, means supporting said shaft and mounted for rocking on an axis extending radially of the drum allowing the same to swing, an arm connected to turn said shaft, and means on said axle engaging said arm proximate the axis about which the stub axle turns.

10. In combination, an axle, a stub axle mounted to rotate on a swivelling axis at the end of said axle, a wheel on said stub axle, cooperating brake means including parts, one rotatable with the wheel and the other independent of the wheel but swivelling with the stub axle, rotatable actuating means to operate said brake means, said actuating means mounted for bodily movement on an axis at right angles to said axis of rotation and carried by the stub axle, an operating member independent of the stub axle and at right angles to said axis of rotation and contacting said actuating means, the point of contact between said actuating means and operating means movable into a position, when the brake is applied, such that in steering movements the contacting point rotates about a point common to the swivelling axis and the axis of bodily movement of the actuating means.

11. In brake mechanism for vehicles, having a wheel with a pivot axis for steering an actuating shaft rotatable about its longitudinal axis for applying a brake to said wheel, said actuating shaft being also mounted for rocking about a fixed axis at right angles to its axis of rotation, said rocking axis substantially intersecting an extension of wheel steering pivot axis.

In testimony whereof I affix my signature.

ORMOND E. HUNT.